United States Patent
Honda et al.

(10) Patent No.: US 6,690,573 B2
(45) Date of Patent: Feb. 10, 2004

(54) ALUMINUM ELECTROLYTIC CAPACITOR AND METHOD FOR PRODUCING THE SAME

(75) Inventors: Kazumitsu Honda, Osaka (JP); Nario Niibo, Osaka (JP); Hisao Miyazawa, Shiga (JP); Yoshihiro Watanabe, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/321,580

(22) Filed: Dec. 18, 2002

(65) Prior Publication Data

US 2003/0169559 A1 Sep. 11, 2003

(30) Foreign Application Priority Data

Dec. 18, 2001 (JP) .................................. P 2001-384327

(51) Int. Cl.[7] .............................................. H01G 9/042
(52) U.S. Cl. ...................... 361/509; 361/511; 361/512
(58) Field of Search .................... 361/503, 504, 361/509, 511, 512, 516, 517, 525, 528–530, 535; 29/25.03

(56) References Cited

U.S. PATENT DOCUMENTS

| | | | |
|---|---|---|---|
| 5,914,852 A | * | 6/1999 | Hatanaka et al. ........... 361/523 |
| 6,064,563 A | * | 5/2000 | Yamada et al. ............. 361/521 |
| 6,128,179 A | * | 10/2000 | Morokuma ................. 361/517 |
| 6,166,899 A | * | 12/2000 | Tamamitsu ................. 361/504 |

FOREIGN PATENT DOCUMENTS

| | | |
|---|---|---|
| JP | 62-268121 | 11/1987 |
| JP | 2-14506 | 1/1990 |
| JP | 2-51209 | 2/1990 |
| JP | 2-194611 | 8/1990 |
| JP | 2-312218 | 12/1990 |

* cited by examiner

Primary Examiner—Anthony Dinkins
(74) Attorney, Agent, or Firm—Wenderoth, Lind & Ponack, L.L.P.

(57) ABSTRACT

An electrolytic capacitor is provided, comprising a capacitor element constituted in the way that an anode foil and a cathode foil with a lead for external connection connected thereto, respectively, are wound, with a separator intervening between them, and a cylindrical metal case, having a bottom, including the capacitor element, and a sealing plate for sealing an opening of the metal case, wherein a gel-like polymer having ion conductivity is formed inside and outside part of the above described capacitor element, and the above described gel-like polymer firmly attached to an inside the above described metal case, and thus the capacitor element is fixed. The gel-like polymer having conductivity is a mixture with an acrylic copolymer, to which an electrolytic solution is infiltrated to uniformly distribute the electrolytic solution. Thereby, an aluminum electrolytic capacitor having high breakdown voltage and high heat resistance, and at the same time excellent strengthened mechanical property against vibration demanded for a capacitor.

19 Claims, 4 Drawing Sheets

ALUMINUM ELECTROLYTIC CAPACITOR AND METHOD FOR PRODUCING THE SAME

BACKGROUND OF THE INVENTION

1. Field of Invention

The present invention relates to an aluminum electrolytic capacitor for various electronic devices, and to a method for producing the same.

2. Prior Art

FIG. 3 shows one constitution of conventional aluminum electrolytic capacitors. A capacitor element 39 is formed such that an anode foil 31 on which a dielectric oxide layer is formed by anodizing a surface which have increased in effective surface area by etching and a cathode foil 32 currently made of an aluminum foil which is etched are wound through a separator 33 made of a Kraft paper or Manila paper, etc. disposed there between.

In the capacitor element 39, an anode lead 35 and a cathode lead 36 are connected to the anode foil 31 and the cathode foil 32, respectively, and a driving electrolytic solution 34 is infiltrated into them. The capacitor element 39 is inserted into a metal case 38, such as an aluminum case, which subsequently is sealed by a sealing plate 37 made of rubber to complete an aluminum electrolytic capacitor.

The electrolytic solution 34 including boric acid or ammonium borate as a solute in organic solvent has been conventionally known. As other organic solutes, dibasic acid, such as azelaic acid, butyl octanedioic acid, 5,6-decane dicarboxylic acid, and dibasic acids having side chains, and their salts have been also used. These organic carboxylic acids have an advantage of reducing content of water in the driving electrolytic solution 34, therefore are able to suppress a phenomenon of a safety plug of the case breaking out by increased internal pressure of water content under operation environments exceeding 100° C.

Moreover, in driving electrolytic solutions for driving 34, surfactant have been added for the purpose of increasing a spark generating voltage of electrolytic solution, and improving anodizing performance. Polyethylene glycol (Japanese Patent Publication No. 62-268121), polyglycerine (Japanese Patent Publication No. 02-194611), polyvinyl alcohol (Japanese Patent Publication No. 02-051209), and alkylene block polymers (Japanese Patent Publication No. 02-312218) have been disclosed as surfactants.

Moreover, a technique of adding a gelling agent to an electrolytic solution in the light of leak suppression is also described in Japanese Patent Publication No. 02-014506. However, the gelling agents known until now are agar, cellulose, and gelatin, which have inadequate heat resistance, these materials can not keep stable shapes at a high temperature. Further, adding of a polymer alone showed insufficient uniformity.

However, aluminum electrolytic capacitors used for suppressing higher harmonics and/or vehicles in recent years are required to have, a high reliability over conventional capacitors including a higher breakdown voltage, a higher heat resistance, a longer life, and excellent vibration resistance property.

Conventional electrolytic solutions in which organic carboxylic acid or salt as a solution and the surfactant are added cannot satisfy the above described requirements, and a new electrolytic solution is required to satisfy high breakdown voltage, i.e., improve spark generating voltage, a high heat resistance, and a long life.

An aluminum electrolytic capacitor in which a capacitor element is fixed inside a metal case by a fixing member made of resin is also proposed so that it may not easily vibrate by external impact. The fixing member is formed with a thermoplastic resin, such as atactic polypropylenes, but an increase in ambient temperature on the electrolytic capacitor softens the fixing member, and vibration applied oscillates the capacitor element relative to the container, and thereby occasionally, this vibration breaks leads from the capacitor elements, resulting in loss of capacitor functions.

SUMMARY OF THE INVENTION

An object of the present invention is, to solve the conventional problems above, to provide an aluminum electrolytic capacitor to improve reliability with high breakdown voltage, high heat resistance and long life, and to provide a method for producing the same.

Another object of the present invention is to provide an aluminum electrolytic capacitor in which a capacitor element has a high vibration resistance in a metal case even at relative high temperatures.

In the aluminum electrolytic capacitor of the present invention, heat-resistant gel-like polymer is used in which an electrolytic solution is infiltrated as an electrolyte. The electrolytic solution infiltrated gel-like polymer contains an electrolytic solution and a polymer in which the electrolytic solution is infiltrated, the gel-like polymer is included inside a capacitor element formed such that an anode foil, a cathode foil, and a separator placed among them are wound, and placed inside a metal case, and thereby high heat resistance and high breakdown voltage are produced in the aluminum electrolytic capacitor.

In the capacitor of the present invention, gel-like high infiltrated with an electrolytic solution polymer is filled not only inside the capacitor element but in a clearance between an external surface of the capacitor element, and an internal surface of a cylindrical metal case having a bottom so that the capacitor element can be firmly fixed inside the metal case. This provides high vibration resistance property for the capacitor.

Especially, as a gel-like polymer can be given characteristics not easily to be softened at higher temperatures than room temperature, the capacitor may have good vibration resistance property even at so high temperatures.

In the present invention, the gel-like polymer shows a semi-solid-state after infiltration of an electrolytic solution, and constructs a skeleton having many pores in which a conductive electrolytic solution may be impregnated.

The present invention includes a method of producing an aluminum electrolytic capacitor using a heat-resistant conductive gel-like polymer as an electrolyte. The method of producing the capacitor of the present invention comprises steps of: preparing a coil-like capacitor element by winding an anode foil, a cathode foil, and a separator in between the electrodes; infiltrating the capacitor element with a mixed solution of an electrolytic solution and a gelling agent, and placing the capacitor element in a metal case to fabricate an assembly; and heating the assembly to gelate the gelling agent in the case.

In the method for production of the present invention, polymerizable monomers are included in the gelling agent and after placing the capacitor element into the case, the assembly is heated to polymerize the monomers. Thus obtained gel-like polymer can firmly attach the capacitor element to an internal surface of the metal case, then the capacitor is stabilized in the case, and, as a result, an aluminum electrolytic capacitor having superior vibration resistance property may be provided.

BRIEF DESCRIPTION OF THE DRAWINGS

The present invention will be hereinafter described in detail with reference to accompanying drawings.

DETAILED DESCRIPTION OF THE PREFERRED EMBODIMENT

Figure 1:
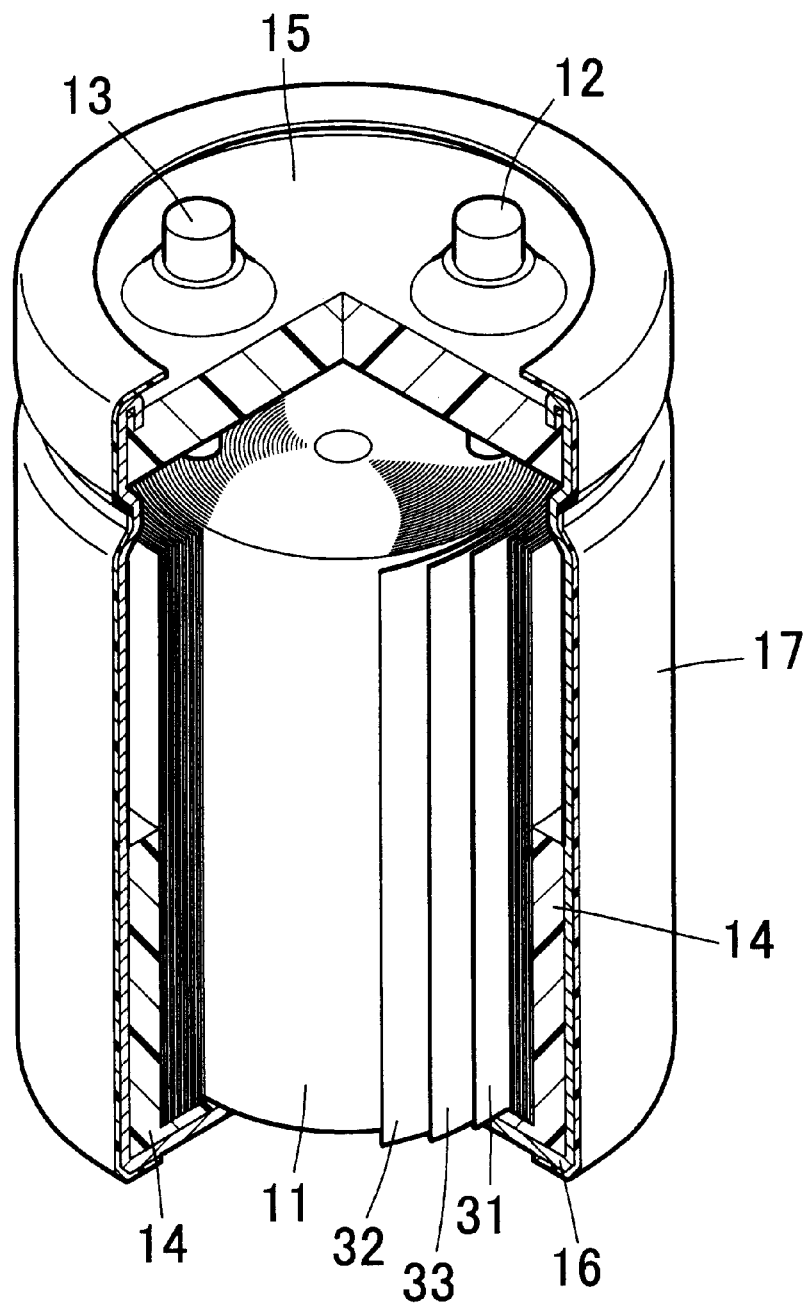
FIG. 1 shows a perspective view including partial cross section of an aluminum electrolytic capacitor by one embodiment of the present invention.

An electrolytic capacitor of the present invention comprises: a capacitor element constituted by winding an anode foil, a cathode foil, made of aluminum having a lead for external connection connected thereto and a separator intervening there between; a cylindrical metal case having a bottom for accommodating the capacitor element; and a sealing plate for sealing the opening of the metal case, wherein the electrolytic capacitor includes a gel-like polymer inside the capacitor element and between the capacitor element and an internal surface of the metal case, the gel-like polymer containing an electrolytic solution and a polymer infiltrated by the electrolytic solution, and firmly attaching the capacitor element to the internal surface of the metal case.

The gel-like polymer contains the electrolytic solution having ion conductivity within the polymer polymerized both in the interior and exterior of the capacitor element by using polymerization initiators. The electrolytic solution gives conductivity between electrodes in the capacitor element, and at the same time, the gel-like polymer can fix the capacitor element firmly to the internal surface of the metal case.

That is, on the inside and outside of the capacitor element, the electrolyte in the gel-like polymer produces ion conductivity property between a dielectric oxide layer of the anode foil and the cathode foil and thus improves breakdown voltage and heat resistance of the capacitor. Since the gel-like polymer fixes the capacitor element to the internal surface of the metal case, the aluminum electrolytic capacitor having high vibration resistance property may be provided.

In the above described gel-like polymer, the electrolytic solution is preferably a mixed liquid solution of a polar solvent and solute of acids or salts, and the polymer is preferably a copolymer of acrylic esters obtained by polymerization in the presence of a polymerization initiator of organic peroxide.

The above gel-like polymer may preferably be include: a polar solvent; a solute containing acid or salt; and a copolymer with acrylic esters. A copolymer of acrylic esters has satisfactory compatibility with polar solvents and shows a tendency to incorporate, into a matrix cross-linked copolymer, a polar solvent which resolves at least one solute selected from a group consisting of inorganic and organic acids and salts of inorganic and organic acids, resulting in a high ionic conductivity at ordinary temperatures.

Moreover, the above matrix shows characteristics of superior short-circuit resistance when applied to the aluminum electrolytic capacitor since the matrix can maintain physical distance between both electrodes. Further, the copolymer matrix has high moldability and provides a long life for capacitor without causing chemical reaction with an anode foil or a cathode foil.

The polar solvent in the present invention may include water; ethylene glycol; propylene glycol; 1,4-butanediol; glycerol; polyoxy alkylene polyols (polyethylene oxides, polypropylene oxides, polyoxyethylene oxy propylene glycols with no more than 200 of molecular weight, and use in comtination of thereof) etc.; amido solvents; (N-methyl formamide, N,N-dimethylformamide, N-methyl acetamide, N-methyl pyrrolidinone, etc.); alcoholic solvents (methanol, ethanol, etc.); etheric solvent; (methylal, 1,2-dimethoxy ethane, 1-ethoxy-2-methoxy ethane, 1,2-diethoxy ethane, etc.); nitrile solvents; (acetonitrile, 3-methoxy propionitrile, etc.); furan solvents (2,5-dimethoxy tetrahydrofuran, etc.); sulfolane solvents (sulfolane, 3-methyl sulfolane, 2,4-dimethyl sulfolane, etc.); carbonate solvents (propylene carbonate, ethylene carbonate, diethyl carbonate, styrene carbonate, dimethyl carbonate or methyl ethyl carbonate); lactone solvents (γ-butyrolactone, γ-valerolactone, δ-valerolactone, 3-methyl-1,3-oxaziridine-2-on); 3-ethyl-1, 3-oxazoridine-2-onN, etc.); imidazoridinone solvents (1,3-dimethyl-2-imidazoridinone, etc.); pyrolidone solvents independently or use in combination thereto.

Among them, ethylene glycol, propylene glycol, diethylene glycol, water, lactone solvents, alcoholic solvents, carbonate solvents, ether solvents, nitrile solvents, and furan solvents are preferable.

The solute in the present invention may be at least one selected from a group consisting of inorganic acids, organic acids, or salts of inorganic acids or organic acids.

The acids may include inorganic acids. Inorganic acids may be, boric acid, phosphoric acid, silicotungstic acid, silicomolybdic acid, phosphotungstic acid, phosphomolybdic acid, etc. Especially for electric double layer capacitors, 4-fluoro boric acid, 6-fluoro phosphoric acid, perchloric acid, and trifluoro methansulfonic acid may be included.

The acid may include organic acids. Organic acids may include; polycarboxylic acids (di- to tetravalent-):aliphatic polycarboxylic acid [saturated polycarboxylic acid, for example, oxalic acid, malonic acid, succinic acid, glutaric acid, adipic acid, pimelic acid, suberic acid, azelaic acid, sebacic acid, 1,6-decane dicarboxylic acid, 5,6-decane dicarboxylic acid, 1,7-octane dicarboxylic acid, 7-methyl-7-methoxycarbonyl-1,9-decane dicarboxylic acid, 7,9-dimethyl-7,9-dimethoxy carbonyl-1,11-dodecane dicarboxylic acid, 7,8-dimethyl-7,8-dimethoxy carbonyl-1, 14-tetra decane dicarboxylic acid,: unsaturated polycarboxylic acid, for example, maleic acid, fumaric acid, and itacoic acid]; aromatic polycarboxylic acids, for example, phthalic acid, isophthalic acid, terephthalic acid, tri merit acid, pyromellitic acid; alicyclic type polycarboxylic acids, for example, tetrahydro phthalic acid (cyclohexane-1,2-dicarboxylic acid, etc.), hexa hydro phthalic acid; alkyl (carbon numbers 1 to 3) of these polycarboxylic acids or nitro-substituted products, for example, citraconic acid, dimethyl maleic acid, nitro phthalic acid (3-nitro phthalic acid, 4-nitro phthalic acid); and sulfur content polycarboxylic acids, for example, thio propionic acid; monocarboxylic acids; aliphatic monocarboxylic acids (carbon numbers 1 to 30) [saturated monocarboxylic acids, for example, formic acid, acetic acid, propionic acid, butyric acid, isobutyric acid, valeric acid, caproic acid, enanthic acid, caprylic acid, pelargonic acid, lauryl acid, myristic acid, stearic acid, behenic acid, malic acid, tartaric acid: unsaturated monocarboxylic acids, for example, acrylic acid, methacrylic acid, and oleic acid]; aromatic monocarboxylic acids, for example, benzoic acid, o-nitro benzoic acid, p-nitro benzoic acid, cinnamic acid, naphthoic acid; hydroxy acid, salicylic acid, mandelic acid, resorcin acid, etc.

As the salts, salts of inorganic acids or organic acids can be used, and for example, one kind or two kinds or more of salts of either of the above described inorganic acids or organic acids may be used. Salts of non-metallic elements or non-metallic ions, especially salts of ammonium, amine, or amidine may be preferably included. Since cations do not include metal ions, employment of these salts can improve short-circuit resistance of an aluminum electrolytic capacitor, and thus can advantageously utilize high ionic conductivity.

As the ammonium salts, for example, ammonium salts of the above described inorganic acids or organic acids etc. may be mentioned. Among amines constituting amine salts are included; primary amines (for example, monomethylamine, ethylamine, propyl amine, butyl amine, and ethylenediamine); secondary amines (dimethylamine, diethylamine, dipropyl amine, methyl ethylamine, diphenylamine, diethanolamine); tertiary amines (trimethylamine, triethylamine, tripropyl amine, triphenylamine, triethanolamine); furthermore, quarternary amines (for example, tetramethyl ammonium, tetraethylammonium, tetra propyl ammonium).

The amidine salts include compounds having alkylated amidine groups, or quarternary compounds having arylated alkyl substituted amidine groups, for example, compounds selected from imidazole compounds quarternarized with alkyl groups with carbon numbers 1 to 11 or arylated alkyl groups, benzimidazole compounds, and alicyclic type amidine compounds.

Especially, the quarternarized compounds having alkylated amidine groups are included 1-methyl-1,8-diazabicyclo[5,4,0]undecene-7,1-methyl-1,5-diazabicyclo[4,3,0]nonene-5, 1,2,3-trimethyl imidazolinium, 1,2,3,4-tetramethyl imidazolinium, 1,2-dimethyl-3-ethyl-imidazolinium, 1,3,4-trimethyl-2-ethyl imidazolinium, 1,3-dimethyl-2-heptyl imidazolinium, 1,3-dimethyl-2-(-3'heptyl)imidazolinium, 1,3-dimethyl-2-dodecyl imidazolinium, 1,2,3-trimethyl-1,4,5,6-tetrahydro pyrimidium, 1,3-dimethyl imidazolium, 1-methyl-3-ethyl-imidazolinium, and 1,3-dimethyl benzo imidazolinium.

The copolymer of acrylic esters can be formed by copolymerize at least one monoacrylic ester of polyalcohol having at least one hydroxy group at one terminal or its derivative with at least one polyfunctional acrylate or its derivative.

Since a copolymer of acrylic esters has a hydroxyl group at a terminal group of an acrylic ester or its derivative and the solvent in an electrolytic solution, i.e., a polar solvent has high compatibility with the above noted solutes of acids or salts, the solution may be easily incorporated into the matrix of the cross-linked copolymer, as a result, leading to realization of a gel-like polymer with high ion conductivity.

The monoacrylic ester of polyhydric alcohols or its derivative in the invention is an organic compound of ester including one acrylic group and two or more of hydroxyl groups, as exemplified with phosphates of polyalkylene glycol monoacrylate represented by Formula 1, polyethylene glycol monoacrylate monosuccinates represented by Formula 2, glycerol monoacrylic esters represented by Formula 3, and polyethylene glycol monoacrylates represented with Formula 4.

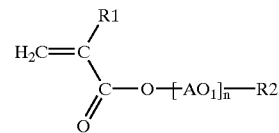

Where, R1 represents H, or an alkyl group with carbon numbers 1 to 5, and R2 represents H. $AO_1$ represents oxy alkyl group with carbon number 2 to 4, and n is a number of average addition moles of $AO_1$, and is 1 to 200.

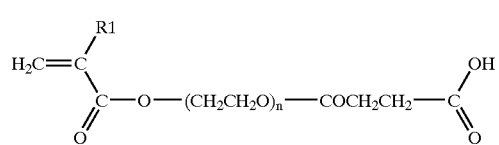

Where R1 represents H, or alkyl group with carbon numbers 1 to 5, and n is a number of average addition moles of oxy alkylene group, and is 1 to 200.

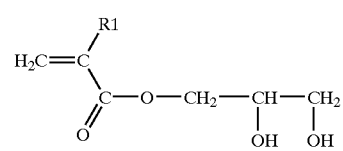

Where and R1 represents H, or alkyl group with carbon numbers 1 to 5.

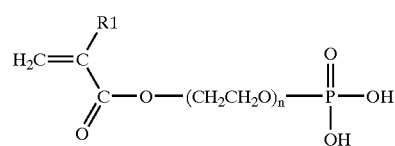

Where R1 represents H, or alkyl group with carbon numbers 1 to 5, and n is a number of average addition moles of oxy alkylene group, and is 1 to 200.

On the other hand, the polyfunctional acrylate or its derivative in the invention is an ester compound including no ore than two acrylic groups at terminal groups. The polyfunctional acrylate may be a diacrylic ester or its derivative, for example, polyalkyleneglycol diacrylic ester represented by Formula 5, or glycerol-1,3-di-acrylic ester represented by Formula 6.

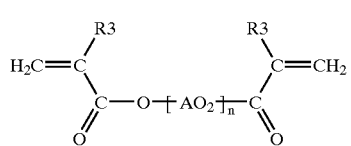

Where, R3 represents H or alkyl group with carbon numbers 1 to 5, and $AO_2$ represents oxy-alkylene group with carbon numbers 2 to 4.

Referential notation n is a number of addition average moles of $AO_2$, and is 1 to 200.

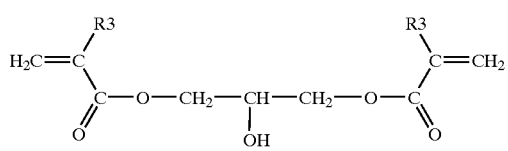

Where, R3 represents H or alkyl group with carbon numbers 1 to 5.

The polyfunctional acrylate or its derivative in the present invention may be triacrylic acid ester or its derivative, for exampple, trimethylol methane represented by Formula 7, or triacrylic ester or its derivative, for example ethyleneoxide adduct represented by Formula 8.

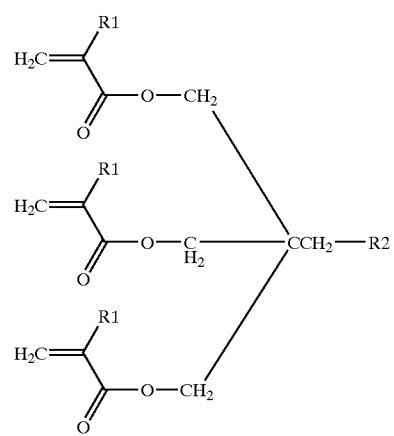

Where, R1 represents H or alkyl group with carbon numbers 1 to 5, and R2 represents H or alkyl group with carbon numbers 1 to 5, and may be same as R1, or may be different from R1.

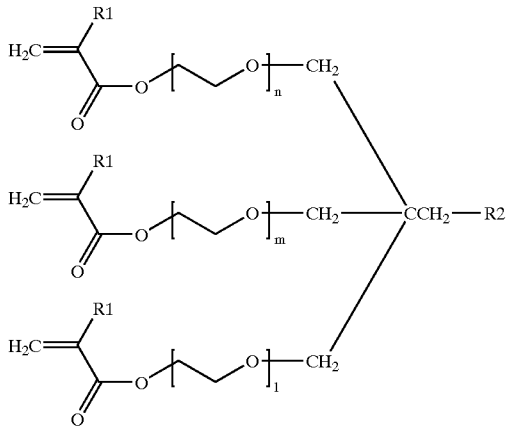

Where, R1 represents H or alkyl group with carbon numbers 1 to 5, and R2 represents H or alkyl group with carbon numbers 1 to 5, and may be same as R1, or may be different from R1. Referential numeral 1, and referential notations n and m are numbers of average addition moles of oxyalkylene group, and are 1 to 200.

The polyfunctional acrylate may be tetra-acrylic ester or its derivative, for example, pentaerythritol tetra acrylic ester represented by Formula 9, and 2,2,2',2'-tetra acrylyloxy methyl-n-butyl ether represented by Formula 10.

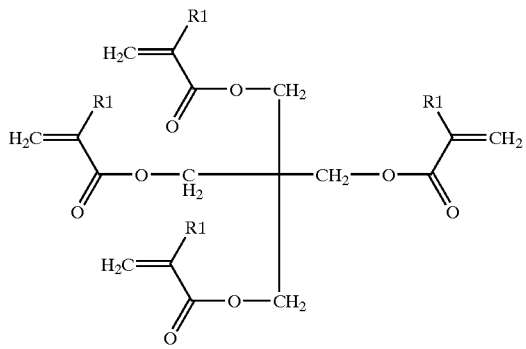

Where, R1 represents H or alkyl group with carbon numbers 1 to 5.

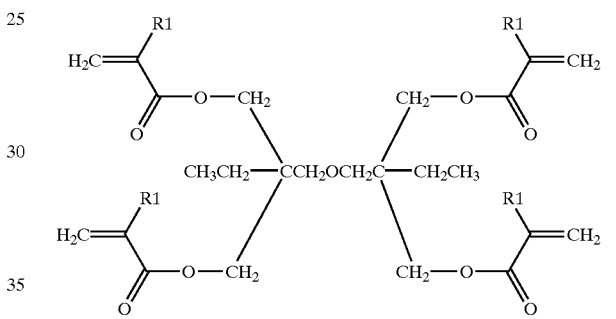

Where, R1 represents H or alkyl group with carbon numbers 1 to 5.

The polyfunctional acrylate or its derivative in the present invention may be hexa-acrylic ester or its derivative, for example, 2,2,2,2',2',2'-hexaacrylyloxy methyl-ethyl ether represented by Formula 11, or dicarbamic acid mono- or poly acrylyloxy substituted alkyl ester represented by Formulas 12 to 15.

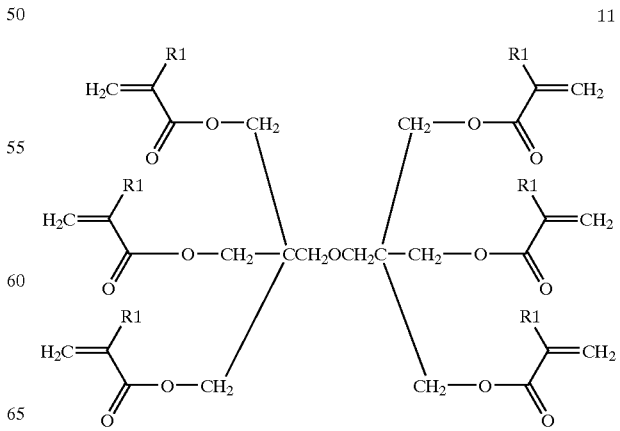

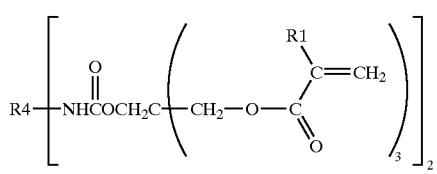

12

Where, R1 represents H or alkyl group with carbon numbers 1 to 5, and R4 is represented by a following Formula 16.

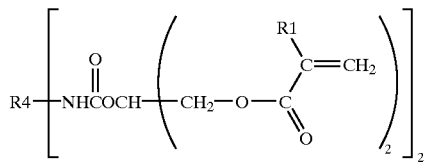

13

Where, R1 represents H or alkyl group with carbon numbers 1 to 5, and R4 is represented by the following Formula 16.

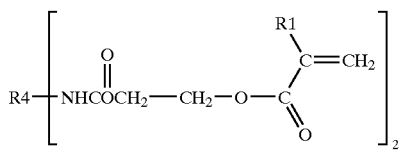

14

Where, R1 represents H or alkyl group with carbon numbers 1 to 5, and R4 is represented by the following Formula 16.

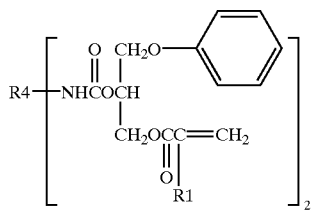

15

Where, R1 represents H or alkyl group with carbon numbers 1 to 5, and R4 is represented by the following Formula 17.R4 is represented by following Formula commonly in Formulas 12 to 15.

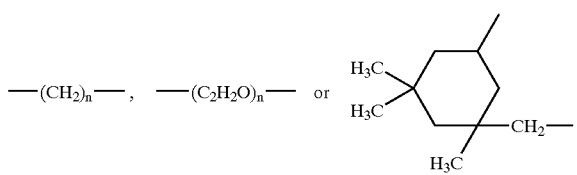

16

Where, n represents an integer of 1 to 9.

The polyfunctional acrylate ester derivatives having no less than two tacrylic groups include phospho diester of diacrylic acid ester derivatives, and, for example, phospho diesters of polyethylene glycol monoacrylates etc. represented by Formula 17.

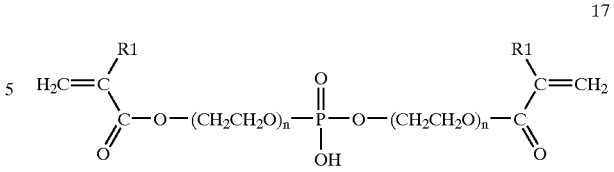

17

Where, R1 represents H or alkyl group with carbon numbers 1 to 5, and n is an integer of 1 to 9.

The copolymer of acrylic esters in the present invention preferably comprises a copolymer matrix of acrylic esters obtained by polymerizing a monomer monoacrylic ester of the above described polyhydric alcohols or its derivative with a monomer of the above acrylic ester or its derivative at a ratio of 100:3 to 3:100 by weight. Especially, this ratio may preferably be 100:10 to 10:100, and in this way, a skeleton of the acrylate polymer is stabilized, leading to improved heat resistance.

A gel-like acrylate polymer may be contained 5 to 50% by weight of content of acrylic ester to a sum total weight of a polar solvent and the above described solutes. When a content of acrylic ester is less than 5% by weight, matrix of cross-linked copolymer is insufficient, and there is a possibility that sufficient curing cannot be attained. Moreover, since absolute amount of electrolyte incorporated in the matrix will become less when a content exceeds 50% by weight, ionic conductivity significantly reduces and sufficient characteristics may not be demonstrated.

In the present invention, as a polymerization initiator, organic peroxides are preferable in general. As an initiator often used, α,α'-azobisisobutyronitrile (henceforth, referred to as AIBN) is known as a substance also with easy handling, and the reason is that since it solidifies, while including bubbles in gel, when it decomposes to generate radicals simultaneously accompanying generation of nitrogen gas, it hardly forms uniform gel-like polymer. Since organic peroxides used in the present invention do not accompany formation of gas of nitrogen and others, it leads to formation of uniform gel-like polymer.

Especially organic peroxides as polymerization initiator are preferable peroxy esters. In polar solvents used for a electrolytic capacitor, many kinds of organic peroxides exist that form oily matter and dispersed, and that may not be uniformly dissolved, and these peroxides disturb uniform polymerization in subsequent polymerization process to form locally insufficient polymerized portion, thus leading to a dangerousness of causing short circuit accident during use of the capacitor. In peroxy esters, compatibility with polar solvents are utilized, which enalbes uniform polymerization of acrylate monomer, and, as a result short circuit voltage is increased.

Among peroxy esters for polymerization initiation may be used t-hexyl peroxy-2-ethyl hexanate, t-butyl peroxy-2-ethyl hexanate, t-butyl peroxy isobutylate, t-hexyl peroxy isopropyl mono carbonate, t-butyl peroxy maleic acid, t-butyl peroxy-3,3,5-tri methyl hexanate, t-butyl peroxy laurate, 2,5-dimethyl-2,5-bis(m-toluoyl peroxy)hexane, t-butyl peroxy isopropyl mono carbonate, t-butyl peroxy-2-ethyl hexyl monocarbonate, t-hexyl peroxy benzoate, 2,5-dimethyl-2,5-bis(benzoyl peroxy)hexane, t-butyl peroxy acetate, t-butyl peroxy benzoate, di-t-butyl peroxy isophthalate.

Electrolytic capacitors include separators placed between cathode foils and anode foils, and porous thin coat is used as the separators. A polymer matrix infiltrates into a separator to form a network, and then the network thus formed secures conductivity and at the same time physically maintains a distance between electrodes. As such separators, Manila papers, kraft papers, cellulose papers, Hemp papers, nonwoven fabrics, and separators of paper made of the above described materials etc. may be used.

It is preferable that a range of weight per unit area (specific weight) of paper separators is 0.01 to 55 g/m$^2$.

In conventional electrolytic solutions or solid polymer electrolytes, paper separators having such low specific weight caused short circuit between electrodes, and could not maintain stable breakdown voltage characteristics.

However, since an electrolytic capacitor of the present invention uses a gel-like polymer as an electrolyte, the above described polymer matrix easily infiltrates into a structure of the separator and infiltrated in network shape, a distance between both electrodes is physically maintained, thus leading to resultant improvement in breakdown voltage.

As a result, use of a separator having small specific weight is also enabled to medium and high breakdown voltage capacitors in which conventionally it could not be applied, and thereby utilization of satisfactory characteristics becomes possible.

A separator is preferably of porous resin films or nonwoven fabric having a porosity rate in a range of 10 to 90%. A gel-like polymer is distributed in a shape of network in the porous resin films or porous nonwoven fabric, and is included a polar solvent with solutes dissolved therein, thereby an electrode interval space between capacitor elements may be secured while electric conduction carrier is made to pass in the separator.

Such films or nonwoven fabric not only can maintain stable breakdown voltage, but can enable practical use of satisfactory characteristics. Especially use of these separators can greatly lower resistance of the separator in the capacitor element, which can greatly contribute to reduction in ESR, and to obtaining low impedance.

Among the above described porous resin films or a nonwoven fabric are thermoplastic resins, such as polyethylene resins, polypropylene resins, fluororesins, polyester resins, polyamide resins, polyurethane resins, styrene resins, polyethylene terephthalate resins, vinyl chloride resin, vinylcarbazole resin, vinylidene chloride resin, vinyl acetate resin, methacrylic resins, polycarbonate resins, polyacetal resins, cellulosic resins, etc.; and thermosetting resins, such as phenol resins, urea resins, melamine resins, guanamine resins, aniline resins, epoxy resins, unsaturated polyester resins, acrylate resins, xylene resins, silicone resins, and furan resins.

The present invention comprises a method of manufacturing an aluminum electrolytic capacitor described above, wherein the method comprises: an element manufacturing process where a capacitor element is manufactured in the way that an anode foil and a cathode foil with a lead for external connection connected thereto are wound, with a separator intervening there between; a process where a mixed solution of an electrolytic solution and a gelling agent is infiltrated to the capacitor element; a process of assembling the capacitor where the capacitor element infiltrated with the mixed solution is inserted into a metal case; and a heating polymerization process where a gel-like polymer is formed by curing the mixed solution of the electrolytic solution and the gelling agent with heating of an assembled article.

In the above described method, a gelled polymer having ion conductivity is formed in the element in the polymerization process, and then the polymer formed can fix the capacitor element to an internal surface of the metal case to provide an aluminum electrolytic capacitor.

In the producing method of the present invention, it is preferable that a gelling agent consists of monomer(s), a cross-linking agent, and a polymerization initiator, which enables to efficiently form gel-like polymer to provide an aluminum electrolytic capacitor having high breakdown voltage, high heat resistance, vibration resistance property, and long life.

The above described polymerization initiator is preferably organic peroxides whose 10-hour half-life temperature is 70 to 110° C. When the 10-hour half-life temperature of the polymerization initiator to be used is lower than 70° C., the polymerization initiator requires freezer storing or refrigerator storing, management at the time of storage not only requires severe condition, but moreover activity of the polymerization initiator increases, thus leading to a risk of increasing of danger at the time of handling.

On the other hand, since very high reaction temperature will be required or prolonged reaction time will be required at the time of actual polymerization, when the 10-hour half-life temperature is higher than 110° C., heat stress given to a polar solvent, inorganic acids, organic acids, or salts thereof in the capacitor not only becomes larger, but there is a possibility of giving heat stress also to a sealing plate.

Since a 10-hour half-life temperature used for polymerization initiator is 70° C. to 110° C., the above described peroxy ester is preferable as a polymerization initiator.

In the producing method of the present invention, it is preferable to carry out the heating polymerization process at temperatures in a range of 70 to 160° C. At temperatures less than 70° C., a polymerization rate of reaction of the above described acrylic monomer is insufficient, and a hard cured compound may not be obtained. On the contrary, when exceeding 160° C., there is a possibility that a gel-like polymer including a polar solvent and a solute of acids or salts thereof may cause heat deterioration.

A heating process in this temperature range enables formation of a stable gel-like polymer in a short time, and an aluminum electrolytic capacitor having high breakdown voltage, high heat resistance, vibration resistance property, and long life may be provided.

FIG. 1 shows a structure of an electrolytic capacitor. In an anode, an aluminum foil is roughened by etching processing to form a derivative oxide film on a surface thereof by anodic oxidation, and then a leading anode lead 12 is connected thereto. In an cathode, etching processing is given to an aluminum foil, and a cathode lead 13 is connected thereto.

A capacitor element 11 has a form in which an anode foil and a cathode foil are wound to the above described porous separator, and is uniformly loaded between the anode foil and the cathode foil and inside the separator. The capacitor element 11 is inserted into a metal case, and is sealed by a sealing plate, and then the above described pair of leads pass through the sealing plate so that they may expose outside.

A conductive gel-like polymer 14 is infiltrated inside the capacitor element 11, functioning as an electrolyte. Simultaneously, it fills a part including a bottom between the capacitor element 11 and an inner wall of the metal case 16, and also fixes both of them by adhesion, achieving a function as a fixing member.

In the production process, the capacitor element 11 is infiltrated by a mixed solution that includes a solution consisting of acids or salts having ion conductivity and a polar solvent dissolving the acids or salts, and acrylic ester monomer for polymerization. Thus obtained capacitor element 11 is inserted into an aluminum case 16, and an opening of the metal case 16 is sealed with a sealing plate 15.

After sealed, this metal case 16 is heated to polymerize the monomer to form a gel. Consequently, a gel-like polymer 14 having ion conductivity is formed inside the capacitor element 11, on an outer face, and on an internal surface of the metal case 16.

An acrylic ester monomer is heated in existence of a polymerization initiator of organic peroxides having 70° C. to 110° C. of 10-hour half-life temperature, and induces radical polymerization reaction of vinyl groups, resulting in formation of the above described gel-like polymer. In polymerization process, a solution of an acid or a salt and a polar solvent is incorporated in a matrix of the cross-linked copolymer, and demonstrates conductivity.

Figure 4:
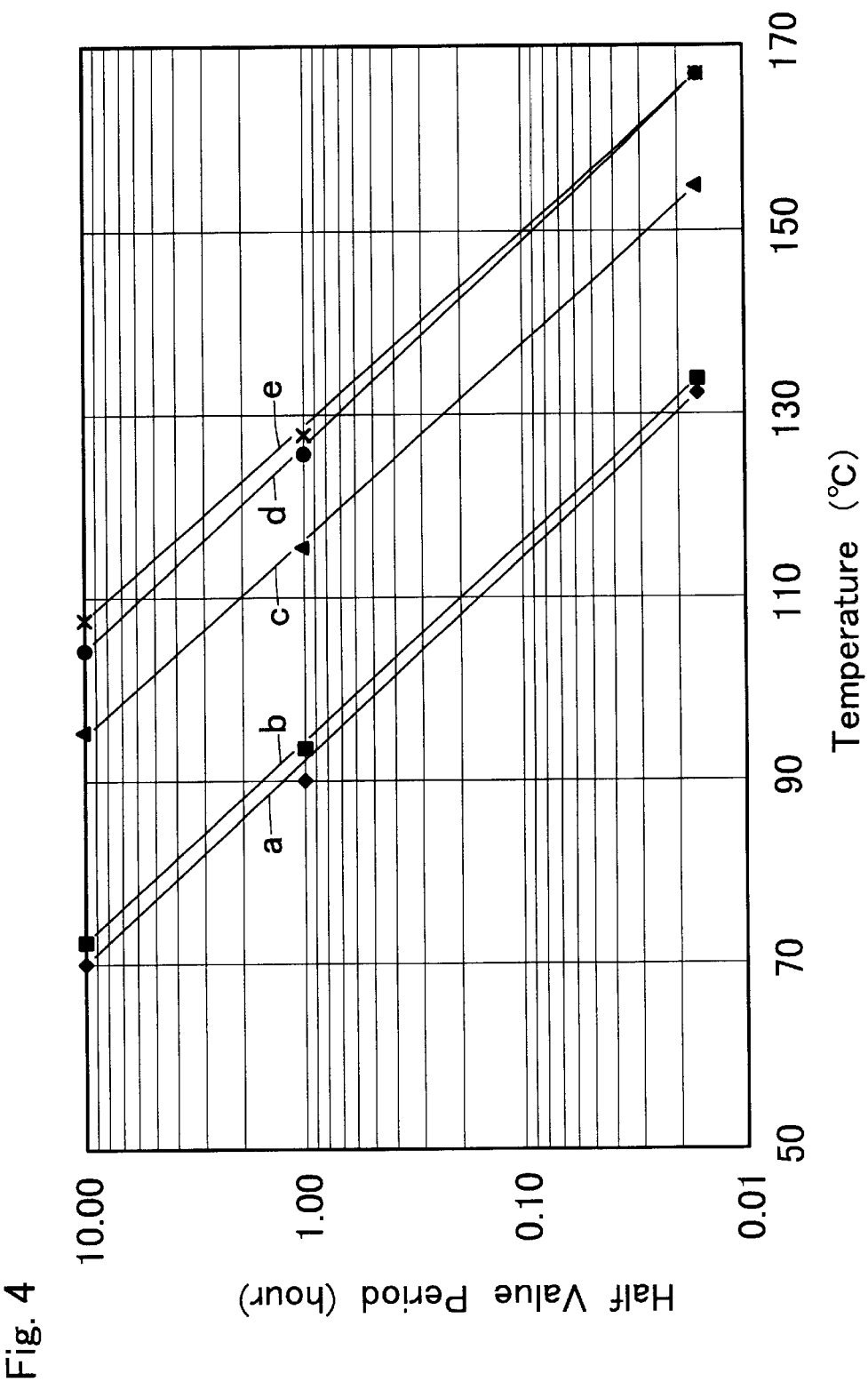
FIG. 4 is a graph showing heating temperature dependency of a reaction time of acrylic ester monomer which is estimated from relation of a polymerization initiator as organic peroxide between half value period and temperature.

A heating temperature and reaction period are calculated from a relationship between a half value period of polymerization initiator, and a temperature. FIG. 4 shows a part of them.

EXAMPLE

Hereinafter, detailed description for embodiments of the present invention will be given, with reference to Examples.

Examples 1 to 8

In an anode foil, a surface of an aluminum foil was roughened by an etching processing, and, subsequently a derivative oxide film (formation voltage 520 V) was formed by an anodic oxidation processing. A cathode foil was obtained by treating an aluminum foil by way of etching processing. As a separator, nonwoven fabric (50 μm in thickness, weight of 25 g/m$^2$) made of polyethylene resin obtained by a spun bond method was used.

A capacitor element was obtained by winding the anode foil and the cathode foil by placing the above described separator between both of them.

Subsequently, in Examples 1 to 8 of the present invention, monomer mixed solutions were prepared using materials shown in Table 1, and in Comparative Examples 1 to 2 compositions of solid electrolyte shown in Table 1 were used. In mixed compositions in Table 1, water content was controlled to 2% by weight. Moreover, Table 2 and 3 show acrylic ester derivatives of Formula 1 and Formula 5 used in each Example.

TABLE 1

|  | Monomer mixed solution | Compo. % by weight | Polymerization temperature (° C.) | conductivity (mS/cm) | Spark generating voltage (V) |
|---|---|---|---|---|---|
| Example 1 | Ethylene glycol | 80 | 105 | 2.2 | 480 |
|  | Ammonium benzoate | 10 |  |  |  |
|  | No. 1 in Table 2 for Formula 1 | 9 |  |  |  |
|  | No. 11 in Table 3 for Formula 5 | 1 |  |  |  |
|  | t-butyl peroxy benzoate | 0.2 |  |  |  |
| Example 2 | Ethylene glycol | 78 | 100 | 2.0 | 460 |
|  | Diammonium azelate | 10 |  |  |  |
|  | No. 1 in Table 2 for Formula 1 | 10 |  |  |  |
|  | No. 12 in Table 3 for Formula 5 | 2 |  |  |  |
|  | t-hexyl peroxy isopropyl monocarbonate | 0.2 |  |  |  |
| Example 3 | Ethylene glycol | 76 | 95 | 3.2 | 458 |
|  | Ammonium maleate | 10 |  |  |  |
|  | No. 3 in Table 2 for Formula 1 | 12 |  |  |  |
|  | No. 13 in Table 3 for Formula 5 | 2 |  |  |  |
|  | t-butyl peroxy isopropyl monocarbonate | 0.3 |  |  |  |
| Example 4 | Ethylene glycol | 8 | 95 | 20 | 465 |
|  | Water | 70 |  |  |  |
|  | Di ammonium adipate | 10 |  |  |  |
|  | No. 5 in Table 2 for Formula 1 | 10 |  |  |  |
|  | No. 12 in Table 3 for Formula 5 | 2 |  |  |  |
|  | t-butyl peroxy isopropyl monocarbonate | 0.3 |  |  |  |
| Example 5 | Ethylene glycol | 70 | 80 | 3.1 | 420 |
|  | Di ammonium adipate | 10 |  |  |  |
|  | No. 9 in Table 2 for Formula 1 | 15 |  |  |  |
|  | No. 13 in Table 3 for Formula 5 | 5 |  |  |  |
|  | t-hexyl peroxy-2-ethyl hexanate | 0.2 |  |  |  |
| Example 6 | Ethylene glycol | 76 | 110 | 2.4 | 465 |
|  | Ammonium 1,7-octane dicarboxylate | 10 |  |  |  |
|  | Formula 4 | 22 |  |  |  |
|  | No. 12 in Table 3 for Formula 5 | 2 |  |  |  |
|  | R1: —CH$_3$ for Formula 17, n = 1 | 0.01 |  |  |  |
|  | t-butyl peroxy benzoate | 0.2 |  |  |  |
| Example 7 | Ethylene glycol | 78 | 110 | 2.5 | 420 |
|  | Ammonium 1,6-decane dicarboxylate | 10 |  |  |  |
|  | Formula 2 | 10 |  |  |  |
|  | Formula 9 | 2 |  |  |  |
|  | t-hexyl peroxy isopropyl monocarbonate | 0.3 |  |  |  |

TABLE 1-continued

| | Monomer mixed solution | Compo. % by weight | Polymerization temperature (° C.) | conductivity (mS/cm) | Spark generating voltage (V) |
|---|---|---|---|---|---|
| Example 8 | Ethylene glycol | 77 | 120 | 2.0 | 470 |
| | Ammonium benzoate | 10 | | | |
| | Formula 3 | 12 | | | |
| | Formula 10 | 1 | | | |
| | t-butyl peroxy acetate | 0.3 | | | |
| Comparative 1 | Polyethylene oxide | 90 | — | 0.003 | 50 |
| | Lithium cobaltate | 10 | | | |
| Comparative 2 | Ethylene glycol | 75 | — | 2.3 | 100 |
| | Ammonium azelate | 10 | | | |
| | Alkyl cellulose | 15 | | | |

TABLE 2

Example of detailed structure of compounds shown by Formula 1

| No. | $R_1$ | $AO_1$ $AO_1$ (addition mol number) polymerization state | MW | $R_2$ |
|---|---|---|---|---|
| 1 | $CH_3$— | EO (1.0) - | 130 | H |
| 2 | $CH_3$— | EO (2.0) - | 174 | H |
| 3 | $CH_3$— | EO (4.5) - | 284 | H |
| 4 | H— | EO/PO (3.5/2.5) Random | 363 | H |
| 5 | $CH_3$— | EO (8.0) - | 420 | H |
| 6 | $CH_3$— | EO/TMO (8.4/2.7) Random | 600 | H |
| 7 | $CH_3(CH_2)_2$— | EO/PO (14.8/6.0) Block | 1100 | H |
| 8 | $CH_3$— | EO/PO (85.2/15.5) Random | 4700 | H |
| 9 | $CH_3$— | EO (8.0) | 500 | H |

TABLE 3

Example of detailed structure of compounds shown by Formula 5

| No. | Terminal group $R_3$ | $AO_2$ AO (addition mol number) polymerization state | Mw |
|---|---|---|---|
| 10 | $CH_3$— | EO (2) - | 4242 |
| 11 | $CH_3$— | EO (4) - | 330 |
| 12 | $CH_3$— | EO (9) - | 466 |
| 13 | $C_3H_7$— | EO/BO (51.1/10.4) Random | 3000 |
| 14 | H— | EO/PO (11.9/16.8) Block | 1700 |
| 15 | $CH_3$— | EO (13) - | 726 |
| 16 | $C_2H_5$— | EO/PO (14.6/6.0) Random | 1000 |

These monomer mixed solutions and electrolytes were infiltrated to the above described capacitor elements. The infiltrated capacitor element was enclosed into a cylindrical metal case of aluminum having a bottom with a resin-vulcanized butyl rubber sealing material (sealing material hardness: 70 IRHD [international rubber hardness unit] constituting by isobutylene-isoprene rubber polymer 30 parts, carbon 20 parts, and inorganic filler 50 parts, and, subsequently the opening was sealed by a curling processing.

Then, these assembled bodies were heated to obtain an aluminum electrolytic capacitor having a state where capacitor element was fixed to an internal surface of the metal case.

In the above described Examples 1 to 8 and Comparative Example 1, in each case, 20 of aluminum electrolytic capacitors were manufactured and life test and vibration resistance examination were conducted for them. Table 4 shows results. Each rating of aluminum electrolytic capacitor was 350 WV and 470 μF, and a ripple load test was carried out at an examination temperature of 105° C. Moreover, in a vibration resistance examination, vibration patternized by ten steps in a range of 10 to 500 Hz was given, and judgment of disconnection short-circuit was done.

TABLE 4

| | Initial characteristics | | 105 ° C. ripple load test, after 5000 hours | | | Vibration- proof examination |
|---|---|---|---|---|---|---|
| | tan δ (%) | LC (μA) | Δ C (%) | tan δ (%) | LC (μA) | |
| Example 1 | 4.6 | 20 | −0.6 | 6.8 | 11 | No defect observed |
| Example 2 | 4.6 | 21 | −0.2 | 7.0 | 10 | No defect observed |
| Example 3 | 4.5 | 25 | −0.8 | 7.2 | 13 | No defect observed |
| Example 4 | 4.5 | 22 | −0.6 | 7.0 | 12 | No defect observed |
| Example 5 | 4.6 | 25 | −0.5 | 6.9 | 12 | No defect observed |
| Example 6 | 4.7 | 17 | −0.5 | 7.0 | 12 | No defect observed |
| Example 7 | 4.6 | 19 | −0.5 | 7.2 | 10 | No defect observed |
| Example 8 | 4.6 | 22 | −0.5 | 7.2 | 11 | No detect observed |
| Comparative Example 1 | Short-circuit observed 20 out of 20 samples in the act of aging | | | | | |

As opposed to short-circuit formation having been observed in an aging test and were not able to produce normal products, in Comparative Example 1, from result of Table 4, aluminum electrolytic capacitors in Examples 1 to 8 showed stable initial characteristics, and formation of defects, such as short-circuit and valve opening, was not observed by ripple load test at 105° C. after 5000 hours. Moreover, in vibration resistance examination, aluminum electrolytic capacitor in each Example did not show fault at all.

Figure 2:
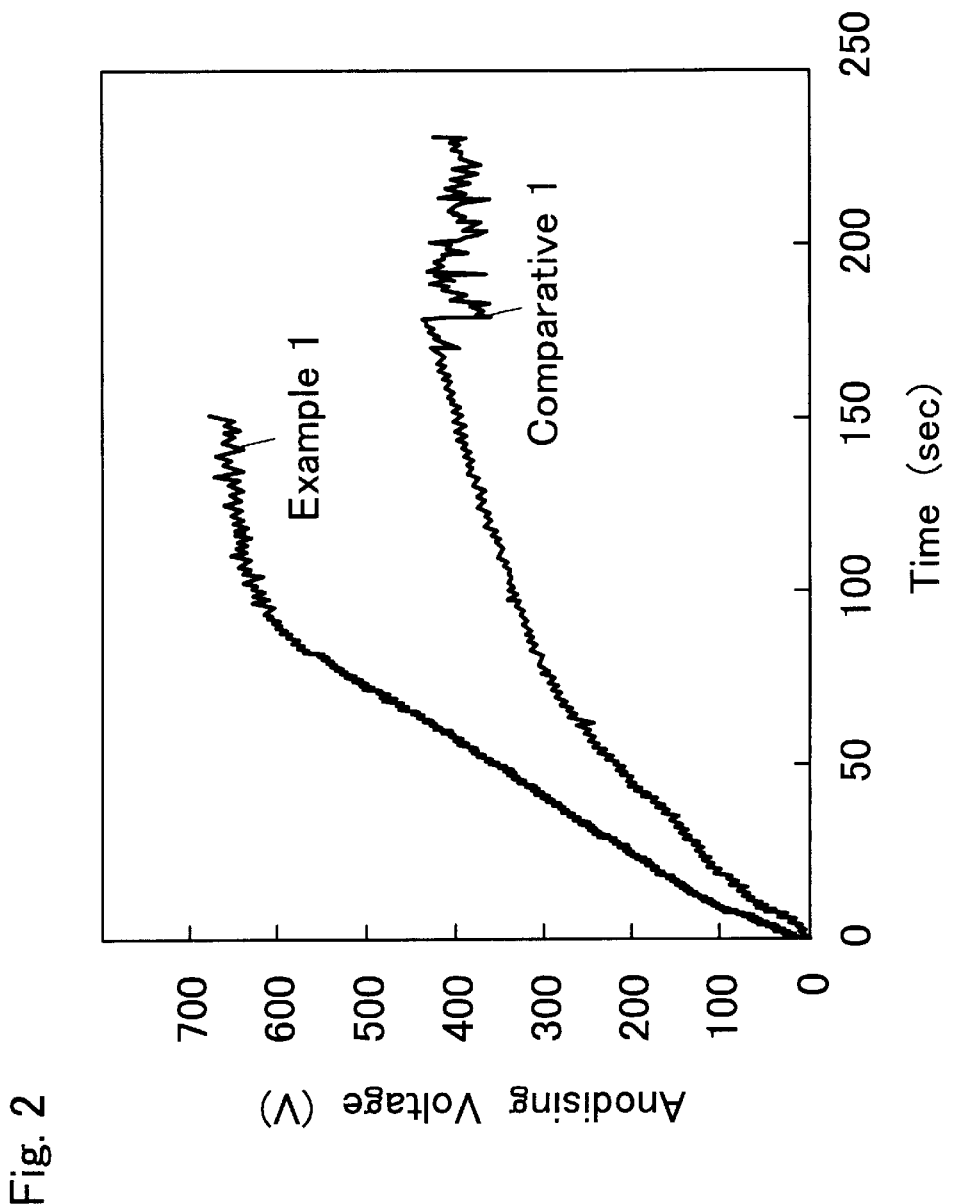
FIG. 2 is a graph showing a variation of anodizing voltage of an electrode foil by one embodiment of the present invention.
Figure 3:
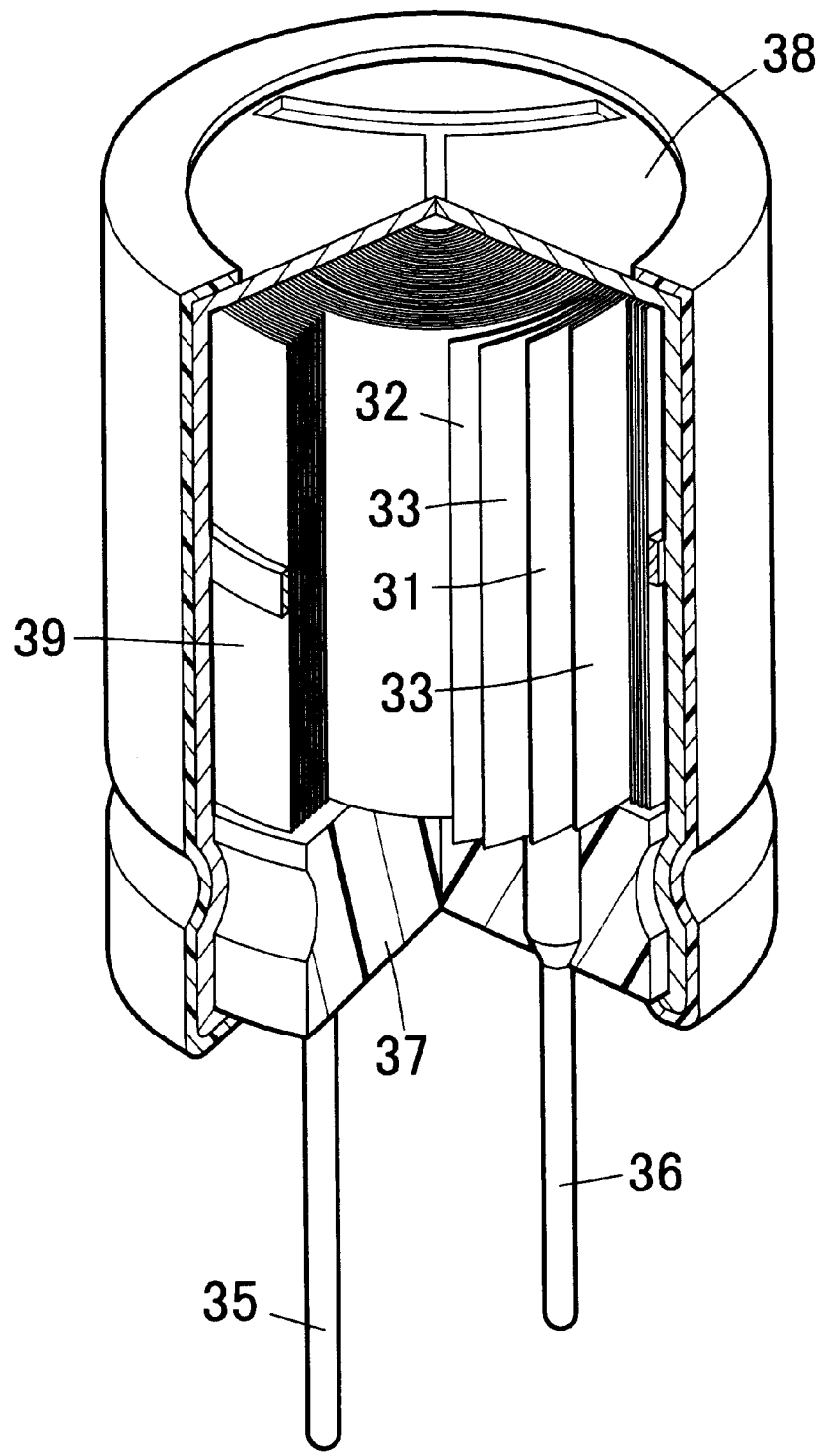
FIG. 3 shows a perspective view including a partial cross section of a conventional aluminum electrolytic capacitor.

Here, FIG. 2 shows a result in which formation capability to an electrode foil by the aluminum electrolytic capacitors of Example 1 and Comparative Example 1 was measured. It is shown that a conductive gel-like polymer of the present invention has no less than 100 V as higher formation capability as in Comparative Example 1.

Thereby, the aluminum electrolytic capacitor in Example 1 has a higher formation capability as compared to the aluminum electrolytic capacitor in Comparative Example 1, under high temperature environment, and this leads to improvement in short-circuit resistance. As a result, it became possible that a separator having a smaller weight compared with conventional separators, or a porous resin film might be used, as a separator, thus leading to realization of outstanding characteristics not obtained in conventional separators.

In this way, it is shown that aluminum electrolytic capacitors using gel-like polymer having ion conductivity in Examples 1 to 8 has stable characteristics to demonstrate excellent effect to heat resistance.

Examples 9 to 12

In Examples 9 to 12 of the present invention, monomer mixed solutions shown in Table 5 were used, and an electrolytic solution of solid electrolyte was used in Comparative Example 2. Water content was adjusted to 2% by weight in mixed containers in Examples 9 to 12. In examinations of these Examples, specific weight of the separators was lowered in sequence of Example 9 to 12.

TABLE 6

Examination result of capacitor of 63 V, 330 $\mu$F

|  | Initial | | Separator | 125° C. DC load, after 5000 hours | | | Vibration-proof |
|---|---|---|---|---|---|---|---|
|  | tan $\delta$ (%) | LC ($\mu$A) | weight (g/m$^2$) | $\Delta$ C (%) | tan $\delta$ (%) | LC ($\mu$A) | examination |
| Example 9 | 2.9 | 30 | 12.0 | −0.8 | 6.1 | 13 | No defect observed |
| Example 10 | 3.1 | 31 | 3.0 | −0.7 | 6.3 | 12 | No defect observed |
| Example 11 | 2.9 | 30 | 1.5 | −0.8 | 6.4 | 12 | No defect observed |
| Example 12 | 2.1 | 29 | 0.1 | −0.6 | 6.3 | 11 | No defect observed |
| Comparative Example 2 | 8.0 | 30 | 32.5 | −10 | 35 | 60 | Short-circuit observed |

From results in Table 6, aluminum electrolytic capacitors in Examples 9 to 12 had equivalent electric characteristics of electrolyte for driving as compared with capacitors in Comparative Example 2. However, as opposed to short circuit formation having been observed in all capacitors in Comparative Example 2 in prolonged stability of aluminum electrolytic capacitors at high temperature, capacitors in

TABLE 5

|  | Material used | Composition wt % | Polymerization temp. ° C. | conductivity (mS/cm) | Sparks voltage (V) |
|---|---|---|---|---|---|
| Example 9 | Ethylene glycol | 75 | 110 | 2.2 | 550 |
|  | Ammonium sebacate | 10 | | | |
|  | No. 3 in Table 2 for Formula 1 | 10 | | | |
|  | No. 12 in Table 3 for Formula 5 | 5 | | | |
|  | t-butyl peroxy benzoate | 0.3 | | | |
| Example 10 | $\gamma$-butyrolactone | 85 | 115 | 2.0 | 410 |
|  | Phthalic acid-1,2,3,4-tetramethyl-imidazolinium | 10 | | | |
|  | No. 4 in Table 2 for Formula 1 | 10 | | | |
|  | Formula 4 | 2 | | | |
|  | No. 11 in Table 3 for Formula 5 | 3 | | | |
|  | t-hexyl peroxy benzoate | 0.25 | | | |
| Example 11 | $\gamma$-butyrolactone | 75 | 125 | 2.4 | 405 |
|  | Monomethyl triethyl ammonium - hydrogen maleate | 10 | | | |
|  | No. 4 in Table 2 for Formula 1 | 10 | | | |
|  | Formula 4 | 2 | | | |
|  | No. 11 in Table 3 for Formula 5 | 3 | | | |
|  | t-butyl peroxy-2-ethyl hexyl monocarbonate | 0.4 | | | |
| Example 12 | Ethylene glycol | 75 | 130 | 2.2 | 470 |
|  | Monomethyl triethyl ammonium - hydrogen phthalate | 10 | | | |
|  | No. 9 in Table 2 for Formula 1 | 10 | | | |
|  | Formula 8 | 5 | | | |
|  | t-butyl-peroxy maleic acid | 0.25 | | | |
| Comparative 2 | Ethylene glycol | 70 | — | 0.8 | 450 |
|  | Ammonium 1,7-octane dicarboxylate | 10 | | | |
|  | $\beta$-1,3-glucan | 10 | | | |
|  | Alkyl cellulose | 10 | | | |

In every Example, 20 of aluminum electrolytic capacitors were manufactured using these monomer mixed solutions, and life test and vibration resistance examination were carried out. Table 6 shows results. Each rating of aluminum electrolytic capacitor is 63 V and 330 $\mu$F, and DC load test was carried out at examination temperature of 125° C.

Examples 9 to 12 showed extraordinary excellent stability, and it turned out that notable difference was observed among them.

Moreover, even if separators having weight in a range of 0.1 to 3.0 g/m$^2$ were used for aluminum electrolytic capacitors in Examples 9 to 12, they did not give short circuit formation at all in load test and in vibration resistance examination.

Examples 13 to 17

Electrolytic capacitors in Examples 13 to 17 of the present invention and Comparative Example 3 were produced using materials shown in Table 7. In these Examples and Comparative Example, water content in monomer mixed solutions and electrolytes for driving was adjusted to 25% by weight.

TABLE 7

|  | Material Formulation | Composition % by weight | Polymeri.- temp. (° C.) | conductivity (mS/cm) | Spark voltage (V) |
|---|---|---|---|---|---|
| Example 13 | Ethylene glycol | 69 | 100 | 0.5 | 520 |
|  | Ammonium borate | 20 |  |  |  |
|  | Formula 2 | 10 |  |  |  |
|  | Formula 7 | 3 |  |  |  |
|  | No. 11 in Table 3 for Formula 5 | 2 |  |  |  |
|  | Formula 17, R1: —CH$_3$, n = 1 | 0.01 |  |  |  |
|  | t-butyl peroxy-2-ethyl hexyl monocarbonate |  |  |  |  |
| Example 14 | Ethylene glycol | 70 | 70 | 0.6 | 520 |
|  | Ammonium borate | 15 |  |  |  |
|  | Formula 2 | 10 |  |  |  |
|  | Formula 11 | 5 |  |  |  |
|  | t-hexyl peroxy-2-ethyl hexanate | 0.3 |  |  |  |
| Example 15 | Ethylene glycol | 70 | 95 | 0.6 | 550 |
|  | Ammonium borate | 15 |  |  |  |
|  | No. 9 of Table 2 for Formula 1 | 12 |  |  |  |
|  | Formula 8 | 3 |  |  |  |
|  | t-butyl peroxy benzoate | 0.3 |  |  |  |
| Example 16 | Ethylene glycol | 60 | 100 | 0.8 | 540 |
|  | Ammonium borate | 25 |  |  |  |
|  | No. 3 in Table 2 for Formula 3 | 13 |  |  |  |
|  | Formula 14, R1: —CH$_3$, R4: —(CH$_2$)$_6$— | 2 |  |  |  |
|  | Di-t-butyl peroxy isophthalate | 0.3 |  |  |  |
| Example 17 | Ethylene glycol | 60 | 145 | 0.7 | 555 |
|  | Ammonium borate | 25 |  |  |  |
|  | No. 1 in Table 2 for Formula 1 | 13 |  |  |  |
|  | No. 13 in Table 3 for Formula 5 | 2 |  |  |  |
|  | Di-t-butyl peroxy isophthalate | 0.4 |  |  |  |
| Comparative 3 | Ethylene glycol | 70 | — | 0.8 | 450 |
|  | Ammonium 1,7-octane dicarboxylate | 10 |  |  |  |
|  | β-1,3-glucan | 10 |  |  |  |
|  | Alkyl cellulose | 10 |  |  |  |

In each Examples and Comparative Example, 20 of aluminum electrolytic capacitors were produced and life test and vibration resistance examination were carried out. Table 8 shows results. Each rating of aluminum electrolytic capacitors is 350 V and 330 μF, and DC load test was carried out at examination temperature of 95° C.

TABLE 8

Examination results of capacitor of B50 V, 330 μF

|  | Initial | | Porous | 125° C. DC load, after 5000 hours | | | Vibration- |
|---|---|---|---|---|---|---|---|
|  | tan δ (%) | LC (μA) | separator resin | Δ C (%) | tan δ (%) | LC (μA) | proof test |
| Example 13 | 3.9 | 21 | Poly-ethylene | −0.5 | 6.7 | 9 | No defect |
| Example 14 | 3.6 | 24 | Poly-urethane | −0.6 | 6.9 | 10 | No defect |
| Example 15 | 4.1 | 30 | Polyester resin | −0.5 | 7.1 | 14 | No defect |
| Example 16 | 4.3 | 32 | Poly-propylene | −0.6 | 7.1 | 15 | No defect |
| Example 17 | 4.2 | 31 | PET* | −0.5 | 7.2 | 15 | No defect |
| Comparative Example 18 | 8.1 | 40 | Poly-ethylene | −3.8 | 14.2 | 29 | breakage in all samples |

*PET = Polyethylene terephthalate

Results in Table 8 show that aluminum electrolytic capacitors in Examples 13 to 17 have slightly lower electric conductivity as compared with sample in Comparative Example 3, but improve spark generating voltage, and that they may reduce LC values in initial characteristics and after life test. Capacitors that were produced using copolymers polymerized using at least one or more kinds selected from a first group represented by Formula 1 to 4, and a second group represented by Formula 5 to 17, respectively, demonstrates excellent characteristics after life test, especially in acrylic esters.

Also in vibration resistance examination, although aluminum electrolytic capacitors in each Example did not give defect at all, all samples in Comparative Example 3 showed disconnection.

In order to clarify more effects shown in Table 7, the aluminum electrolytic capacitors in Example 13 and Comparative Example 3 were disassembled, after life test, for inspection of capacity of cathode foil and outward appearance. Table 9 shows results.

TABLE 9

|  | Initial capacity factor (initial 1) | Cathode foil appearance |
|---|---|---|
| Example 13 | 0.95 | No defect observed |
| Comparative Example 3 | 0.48 | Black discoloration |

As is clear according to results in Table 9, cathode foils in Comparative Example 3 after examination showed reduction to no more than ½ of initial capacity factor and surface black discoloration, but cathode foils in Example 13 of the present invention hardly showed capacity variation, and discoloration was not observed, either.

Thereby it was confirmed that a gel-like polymer of the present invention having ion conductivity including polar solvents; one or more kinds of solutes selected from inorganic acids, organic acids, or salts thereof; and a copolymer matrix comprising acrylic esters; has characteristics to protect cathode foil surface under high temperatures environment. Accordingly, it becomes possible to provide aluminum electrolytic capacitors having stability with long life at high temperatures.

Moreover, in a capacitor elements of gel-like polymer, a bottom part thereof may be fixed minimally, and approximately ⅔ part of the capacitor element may also be fixed.

As described above, in the present invention, since an inside and outside part of the above described capacitor element are infiltrated by a gel-like polymer including an electrolytic solution, capacitors excellent in breakdown voltage and heat resistance may be realized.

Moreover, since a capacitor element is fixed in a metal case by a gel-like polymer, an aluminum electrolytic capacitor excellent in vibration resistance property may be easily obtained. Such an electrolytic capacitor especially can be appropriately used in an audio equipment usage, and sound playback excellent in tone quality with little noise may be realized.

Since a method for producing an aluminum electrolytic capacitor of the present invention comprises at least: an element manufacturing process where a capacitor element is manufactured in the way that an anode foil and a cathode foil with a lead for external connection connected thereto are wound, with a separator intervening between them; a process where a mixed solution of an electrolytic solution and a gelling agent is infiltrated to the capacitor element; a process of assembling where the capacitor element infiltrated with the mixed solution of the electrolytic solution and the gelling agent is inserted into a metal case; and a heating process where the mixed solution of the electrolytic solution and the gelling agent is cured to form a gel-like polymer with heating of an assembled article, the above described gel-like polymer is firmly attached to an internal surface of the above described metal case to fix the capacitor element, outstanding vibration resistance property under ordinary temperatures is demonstrated, and moreover since the gel-like polymer is superior in heat resistance, it excels also in vibration resistance property at high temperatures.

In capacitor obtained by a producing method of the present invention, since a gel-like polymer having ion conductivity is formed in inside and outside of a capacitor element, a capacitor excellent in breakdown voltage and heat resistance may be obtained.

What is claimed is:

1. An aluminum electrolytic capacitor comprising a capacitor element constituted by winding an anode foil and a cathode foil each having a lead for external connection connected thereto together with a separator intervened these between; a cylindrical metal case having a bottom for accommodating the capacitor element; and a sealing plate for sealing the opening of the metal case, wherein the electrolytic capacitor includes a gel-like polymer inside the capacitor element and between the capacitor element and an internal surface of the metal case, the gel-like polymer comprising an electrolytic solution and a polymer infiltrated with the electrolytic solution, and the gel-like polymer firmly attaching the capacitor element to the internal surface of the metal case.

2. The aluminum electrolytic capacitor according to claim 1, wherein in the gel-like polymer the electrolytic solution is a mixture of a polar solvent with a solute selected from a group consisting of acid or salt, and the polymer is an acrylate copolymer polymerized in the presence of an organic peroxide as polymerization initiator.

3. The aluminum electrolytic capacitor according to claim 2, wherein the salts include salts of ammoniums, amines, or amidines.

4. The aluminum electrolytic capacitor according to claim 2, wherein the acrylate copolymer is a copolymer of at least one monoacrylic ester derivative of polyhydric alcohols having a hydroxyl group at terminal groups, and at least one polyfunctional acrylate and its derivative.

5. The aluminum electrolytic capacitor according to claim 2, wherein the acrylate copolymer comprises a copolymer matrix copolymerized of a mixture of a monomer of at least one monoacrylic ester derivative of a polyhydric alcohol with a monomer of at least one polyfunctional acrylate and its derivative at a weight ratio of 100:3 to 3:100.

6. The aluminum electrolytic capacitor according to claim 2, wherein
the gel-like polymer includes 5 to 50%, by weight, of the acrylic ester copolymer based on a sum total weight of the polar solvent and the solute.

7. The aluminum electrolytic capacitor according to claim 1, wherein the organic peroxide as polymerization initiator is peroxy ester.

8. The aluminum electrolytic capacitor according to claim 1, wherein a specific weight of the separator is in a range of 0.01 to 55 g/m$^2$.

9. The aluminum electrolytic capacitor according to claim 1, wherein the separator is a porous resin film or a nonwoven fabric having a porosity in a range of 10 to 90%.

10. A method for producing an aluminum electrolytic capacitor, the method comprising;
preparing a capacitor element by winding an anode foil and a cathode foil each having a lead for external connection connected thereto with a separator intervening there between;

infiltrating a mixed solution of an electrolytic solution and a gelling agent including monomers is infiltrated into the capacitor element;

inserting the capacitor element infiltrated with the mixed solution of the electrolytic solution and the gelling agent into a metal case to be assembled to an assembly; and heating the assembly to polymerize the monomers in the gelling agent to cure the mixed solution of the electrolytic solution and the gelling agent, then a gel-like polymer being formed.

11. The method according to claim 10, wherein the gelling agent comprises the monomers, a cross-linking agent, and a polymerization initiator.

12. The method according to claim 11, wherein the monomers include at least one monoacrylic ester of polyhydric alcohols having a hydroxyl group at terminal groups or its derivative and at least one polyfunctional acrylic ester.

13. The method according to claim 11, wherein the monomers are a mixture of the monomers of at least one monoacrylic ester of a polyhydric alcohol or its derivative, and the monomer of at least one polyfunctional acrylate and its derivative at a weight ratio of 100:3 to 3:100.

14. The method according to claim 13, wherein the gelling agent includes the monomers in the amount of 5 to 50%, by weight, based on the total weight of the polar solvent and the solute selected from a group consisting of acids or salts.

15. The method according to claim 11, wherein the polymerization initiator is an organic peroxide having 70 to 110° C. of 10-hour half-life temperature.

16. The method according to claim 11, wherein the organic peroxide as polymerization initiator comprises peroxy esters.

17. The method according to claim 10, wherein the assembly is heated within a temperature range of 70 to 160° C. in the step of heating the assembly.

18. The method according to claim 10, wherein a specific weight of the separator is in a range of 0.01 to 55 g/m$^2$.

19. The method according to claim 10, wherein the separator comprises a porous resin film or a nonwoven fabric having a porosity rate of 10 to 90%.

* * * * *